(12) United States Patent
Yu et al.

(10) Patent No.: US 12,147,879 B2
(45) Date of Patent: Nov. 19, 2024

(54) FEDERATED LEARNING WITH DATASET SKETCH COMMITMENT BASED MALICIOUS PARTICIPANT IDENTIFICATION

(71) Applicant: International Business Machines Corporation, Armonk, NY (US)

(72) Inventors: Lei Yu, Sleepy Hollow, NY (US); Qi Zhang, West Harrison, NY (US); Petr Novotny, Mount Kisco, NY (US); Taesung Lee, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 943 days.

(21) Appl. No.: 17/180,972

(22) Filed: Feb. 22, 2021

(65) Prior Publication Data
US 2022/0269977 A1 Aug. 25, 2022

(51) Int. Cl.
*G06N 20/00* (2019.01)
(52) U.S. Cl.
CPC .................................. *G06N 20/00* (2019.01)
(58) Field of Classification Search
None
See application file for complete search history.

(56) References Cited

U.S. PATENT DOCUMENTS

| | | | |
|---|---|---|---|
| 10,657,461 | B2 | 5/2020 | McMahan et al. |
| 2019/0108417 | A1 | 4/2019 | Talagala et al. |
| 2019/0220755 | A1* | 7/2019 | Carbune ................ G06N 20/00 |
| 2020/0285980 | A1* | 9/2020 | Sharad ................... G06N 20/20 |
| 2020/0380340 | A1* | 12/2020 | Blanchard .............. H04L 9/002 |
| 2021/0051169 | A1* | 2/2021 | Karame ................. G06N 20/00 |

OTHER PUBLICATIONS

Li et al.("Learning to Detect Malicious Clients for Robust Federated Learning" 2020) (Year: 2020).*
Anonymous, "Context-Dependent Account Selection", IP.com Prior Art Database Technical Disclosure, IP.com No. IPCOM000252363D, Jan. 5, 2018, 39 pages.

(Continued)

*Primary Examiner* — Lut Wong
(74) *Attorney, Agent, or Firm* — Stephen J. Walder, Jr.; Anthony M. Pallone

(57) ABSTRACT

Mechanisms for performing intelligent federated machine learning (ML) model updates are provided. A plurality of ML model updates, and a plurality of dataset sketch commitment data structures (sketches), are received from a plurality of participant computing systems. Each sketch provides statistical characteristics of a corresponding local dataset used by a corresponding participant to train a local ML model. A potentially malicious participant identification operation is performed based on an analysis of the plurality of sketches to identify one or more potentially malicious participants based on differences in sketches. ML model updates received from participant computing systems identified as potentially malicious participants are discarded to thereby generate a modified set of updates. The federated ML computer model is updated based on the modified set of updates.

20 Claims, 4 Drawing Sheets

(56) References Cited

OTHER PUBLICATIONS

Anonymous, "Image Moderation Using Machine Learning", IP.com Prior Art Database Technical Disclosure, IP.com No. IPCOM000252007D, Dec. 13, 2017, 35 pages.

Anonymous, "Incremental sharing using machine learning", IP.com Prior Art Database Technical Disclosure, IP.com No. IPCOM000252683D, Feb. 1, 2018, 33 pages.

Chen, Yudong et al., "Distributed Statistical Machine Learning in Adversarial Settings: Byzantine Gradient Descent", Proc. ACM Meas. Anal. Comput. Syst., vol. 1, No. 2, Article 44, Dec. 2017, 25 pages.

Konecny, Jakub et al., "Federated Optimization: Distributed Machine Learning for On-Device Intelligence", arXiv: 1610.02527v1 [cs.LG], Oct. 8, 2016, 38 pages.

Mcmahan, H. B. et al., "Federated Learning of Deep Networks using Model Averaging", arXiv:1602.05629v1 [cs.LG], Feb. 17, 2016, 11 pages.

Xie, Cong et al., "Zeno: Distributed Stochastic Gradient Descent with Suspicion-based Fault-tolerance", Proceedings of the 36th International Conference on Machine Learning, PMLR 97:6893-6901, Jun. 9-15, 2019, 9 pages.

Yang, Qiang et al., "Federated Machine Learning: Concept and Applications", ACM Trans. Intell. Syst. Technol., vol. 10, No. 2, Article 12, Feb. 2019, submitted version arXiv:1902.04885v1 [cs.AI], Feb. 13, 2019, 19 pages.

Yin, Dong et al., "Byzantine-Robust Distributed Learning: Towards Optimal Statistical Rates", Proceedings of the 35th International Conference on Machine Learning, Jul. 10-15, 2018, 10 pages.

\* cited by examiner

FEDERATED LEARNING WITH DATASET SKETCH COMMITMENT BASED MALICIOUS PARTICIPANT IDENTIFICATION

BACKGROUND

The present application relates generally to an improved computing tool, and an improved computing tool operations and methodology directed to solving issues with regard to federated learning with regard to training computer models. More specifically the present invention is directed to providing improved computer tool mechanisms that perform federated machine learning configuration of a federated computer model using a dataset sketch commitment mechanism to identify/filter potentially malicious participants.

Federated learning, or collaborative learning, involves training a machine learning algorithm, for example a deep neural network (DNN), also referred to herein as a "computer model," on multiple local datasets contained in local nodes (computing devices) without explicitly exchanging the training datasets, or data samples, such that the training datasets may remain private. The general principle consists in training local computer models on local data samples and exchanging parameters, e.g., the weights and biases of a deep neural network, between these local nodes at some frequency to generate a global "federated" model shared by all nodes.

The main difference between federated learning and distributed learning lies in the assumptions made on the properties of the local datasets used to perform the training. Distributed training of computer models aims at parallelizing computing power. Distributed learning also is directed to training a single model on multiple servers and thus, an underlying assumption in distributed learning is that the local datasets are identically independently distributed (iid) and have approximately the same size. However, these assumptions are not present for federated learning. To the contrary, federated learning focuses on training computer models using heterogenous datasets which may have sizes that differ considerable. In fact, these dataset sizes may have sizes spanning several orders of magnitude.

Federated learning enables multiple different entities to collaborate in building a common machine learning model without sharing data and using substantially heterogenous datasets. This assists with addressing issues such as data privacy, data security, access rights, etc.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, the at least one memory comprising computer executable code that, when executed by the at least one processor, causes the at least one processor to be specifically configured to implement a federated machine learning update (FMLU) engine. The method comprises receiving, by the FMLU engine, from a plurality of participant computing systems, a plurality of machine learning (ML) computer model parameter updates for updating a federated ML computer model. The method also comprises receiving, by the FMLU engine, from the plurality of participant computing systems, a plurality of dataset sketch commitment data structures. Each dataset sketch commitment data structure provides statistical characteristics of a corresponding local dataset used by a corresponding participant computing system to train a local ML computer model that is local to the participant computing system. The method also comprises performing, by the FMLU engine, a potentially malicious participant identification operation based on an analysis of the plurality of dataset sketch commitment data structures to identify one or more potentially malicious participants based on differences in dataset sketch commitment data structures. In addition, the method comprises discarding, by the FMLU engine, ML computer model parameter updates received from participant computing systems identified as potentially malicious participants to thereby generate a modified set of updates. Moreover, the method comprises updating parameters of the federated ML computer model based on the modified set of updates.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

As discussed above, federated learning for training machine learning computer models, such as convolutional neural networks (CNNs), deep learning neural networks (DNN), and the like, is a technique that allows collaboration with regard to training a federated computer model without exposing the collaborators' private data. In a federated learning environment, each collaborator computing environment, or participant computing environment (hereafter also referred to simply as a "participant"), starts with a same initial computer model and trains it on their own private local datasets, e.g., training datasets and testing datasets, so that they have their own trained version of the initial computer model. As a result, the locally trained computer models for the collaborators will differ from one another since their training is based on heterogenous datasets relative to the other collaborators. Hence, each collaborator's locally trained computer model will have different operating parameters, e.g., node weights, biases, hyperparameters, and the like.

The collaborators, or participants, may comprise one or more computing systems/devices, with the collaborators/participants sharing their locally trained computer model operating parameters, but not sharing the local datasets. These shared computer model operating parameters are used to update the operating parameters of a federated machine learning computer model, also sometimes referred to as a global machine learning model. For example, the separate updates of operating parameters of the locally trained computer models may be aggregated to generate a federated set of operating parameter updates for the federated machine learning computer model. This federated set of operating parameter updates are then applied to the federated machine learning computer model to thereby "train" the federated machine learning computer model without having to expose the training datasets used as the various collaborators' own local copies of the computer model.

Figure 1:
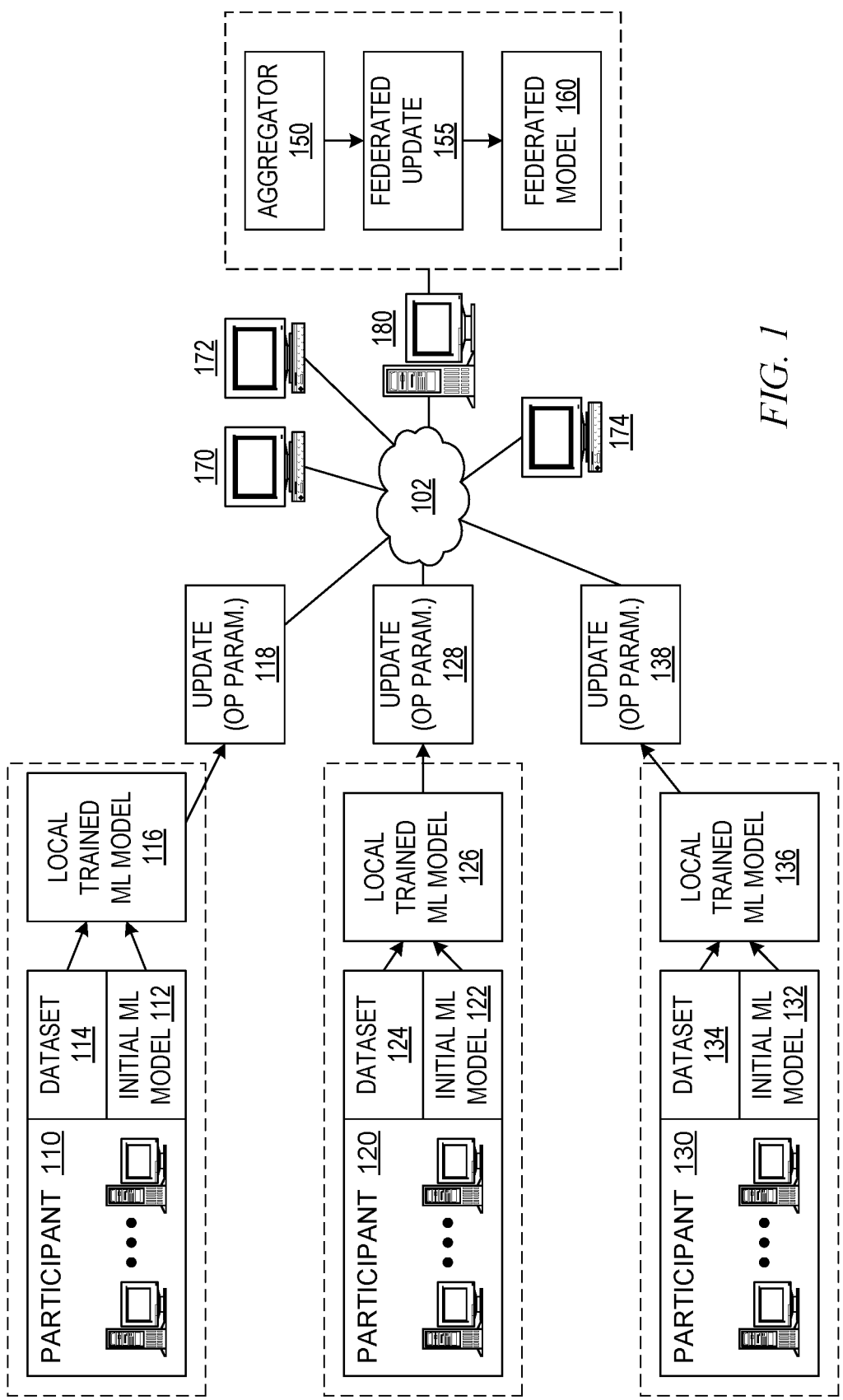
FIG. 1 is an example diagram illustrating a federated machine learning approach for demonstrating the problems in federated machine learning training of a federated machine learning computer model when malicious participants are present.

FIG. 1 is an example diagram illustrating a federated machine learning approach for demonstrating the problems in federated machine learning training of a federated machine learning computer model when malicious participants are present. As shown in FIG. 1, participants (or collaborators) 110, 120, and 130 in the federated machine learning approach each have their own instances of a local copy of the initial computer model 112, 122, 124 which is trained using their own local datasets 114, 124, and 134, respectively. This results in differently trained local copies of the computer models 116, 126, 136 having different operating parameters, e.g., node weights, biases, hyperparameters, etc.

The participants 110, 120, and 130 may be any entity or organizing that implements one or more computing devices, which may be of various types including server computing devices, client computing devices, portable computing devices, smart devices, such as smartphones or other Internet-of-Things (IoT) devices, or any other computing device or computing system that is capable of executing a computer model and training the computer model through a machine learning process based on one or more local datasets. The computer models 112, 122, 132 themselves may be any machine learning computer model that may be trained through a machine learning process using one or more local datasets 114, 124, 134, and may include any type of artificial neural network (ANN), including a convolutional neural network (CNN), a deep learning neural network (DNN), decision tree, support vector machine (SVM), Bayesian network, or any other machine learning computer model or artificial intelligence computer model whose operational parameters may be trained through a machine learning process.

The one or more local datasets 114, 124, and 134 may comprise training data samples, and may also include testing data samples. These training and/or testing data samples may be private data that the participants 110, 120, 130 do not wish to have exposed outside of their own local computing environments. For example, in a healthcare environment, where the local computer models 112, 122, 132, and the federated machine learning computer model 160 are trained to provide healthcare related decision support operations, e.g., treatment recommendations based on patient medical conditions and characteristics, assisting with medical image (e.g., CT scans, MRIs, etc.) analysis and anomaly detection, or the like, while actual patient data may be needed to provide accurate training of machine learning models, the privacy of the patients' data needs to be maintained and thus, if the local datasets 114, 124, and 134 contain private patient data, it is important that the participants 110, 120, and 130 take measures to ensure that this private data is not exposed outside their local environments and is protected.

The training of the local computer models (or simply "models" hereafter) 112, 122, and 132 to generate the trained models 116, 126, and 136 results in a set of operational parameters for these trained models 116, 126, and 136 that differ from one another due to the particular machine learning process and datasets 114, 124, 134 used to perform the machine learning training at the local environments of the participants 110, 120, and 130. These operational parameters are provided as updates 118, 128, and 138 to a centralized computing environment 140 which may comprise one or more computing devices/systems that are configured to implement an aggregator 150 and a federated computer model 160. The aggregator 150 receives, from the participant computing environments 110-130, the updates 118, 128, and 138 and aggregates these updates 118, 128, and 138 using an aggregation methodology specific to the desired implementation, e.g., averaging the operational parameter values across the various updates 118, 128, and 138, determining a mean of the operational parameter values, generating another statistical measure of the various values in the updates 118, 128, and 138, or any other aggregation methodology desired by the implementation. The result of the aggregator 150 aggregation of the updates 118, 128, and 138 is a federated updated 155 for the federated model 160. The federated update 155 provides an update to the operational parameters of the federated model 160 which are then implemented in the federated model 160. The federated model 160 may service other requests from other client computing devices, e.g., 170-174 based on the updated operational parameters generated by the federated updates from the participants 110-130.

It should be noted that in this process, the federated model 160 is not actually trained using a machine learning training operation. Moreover, the participants 110-130 do not expose, outside their own computing environments, the datasets 114, 124, 134 used to generate the updates 118, 128, 138 to the operational parameters. To the contrary, the federated model 160 is configured with the aggregated update 155 of the operational parameters received in the updates 118, 128, and 138 from the local machine learning training of the local models 112, 122, 132 in the participant 110-130 computing environments.

In this federated machine learning approach it is possible that one or more of the participants 110-130, or collaborators, may be a malicious participant that wants to interfere with the proper configuration of the federated model 160. That is, the malicious participant, e.g., participate 130, may train a local model 132 to misclassify input, or otherwise generate incorrect results and thus, will have incorrect operational parameters. For example, in an example implementation, a malicious participant 130 may train a local model 132 to misclassify image input data into incorrect classifications, e.g., a street sign that is a "stop" sign may be misclassified as a speed limit sign. This will result in incorrect updates, i.e., malicious updates 138 being provided to the aggregator 150 which will cause the aggregated update 155 to be incorrect. As a result, the malicious updates 138 will disrupt the federated learning progress, will downgrade the model quality of the federated model 160, and may waste computation effort of the other benign participates 110-120

In some cases, the malicious participant may not perform any local training of a local machine learning computer model at all, but may just send random noise as model updates to the aggregator 150 that could lead to arbitrary deviation of the model parameters from correct model parameters. If the malicious participant can determine the direction of correct model updates by performing normal training, similar to the benign participants, the malicious participant can generate fake updates in the exact opposite direction of correct updates, which effectively voids the training effort of benign participants. A more sophisticated attack may include the malicious participant misleading the federated model 160 to erroneously classify a certain input or a class by sending carefully manipulated model updates. Hence, a malicious participant may modify the training process and generate the model updates 138 with the objective of misclassification, such as classifying the handwriting character "1" to "7," which may cause higher error rate of the federated model 160 for classifying the character "1."

Various solutions have been devised to try to minimize the impact of malicious participants in distributed learning environments. These solutions may be generally grouped into robust aggregation solutions and scoring-based aggregation solutions. Examples of robust aggregation solutions include the trimmed-mean aggregation solution described in Yin et al., "Byzantine-Robust Distributed Learning: Towards Optimal statistical Rates," ICML, 2019 and the median-based aggregation solution described in Chen et al., "Distributed Statistical Machine Learning in Adversarial Settings: Byzantine Gradient Descent," POMACS, 1:44:1-44:25, 2017. An example of scoring-based aggregation solution is described in Cong et al., "Zeno: Distributed Stochastic Gradient Descent with Suspicion-based Fault-tolerance," ICML 2019.

These solutions, and existing solutions in general, focus on the updates to the computer model and do not consider the characteristics of the local training datasets at the participant computing environments, especially since these local training datasets are not accessible outside of the private participant computing environments. Moreover, the effectiveness of robust aggregation solutions is highly dependent on the identical independent distribution (iid) assumption, which does not hold in federated learning, as discussed previously. Because the local datasets 114, 124, and 134 at each participant computing environment are usually non-iid, using simple global mean and median aggregation of updates may degrade the effectiveness against malicious model updates because their capability for the removal of outlier updates is heavily based on the iid distribution of datasets over every participant. That is, in practice, different benign participants may have different underlying data distributions to produce these updates, which makes differentiation between malicious and benign updates difficult to perform. Moreover, scoring-based aggregation can suffer from similar problems when the updates 118, 128, and 138 generated from different data distributions in the various datasets 114, 124, and 134 are not included in the top-K scores used to perform the scoring based aggregation. It is difficult to determine a reasonable value of K that will cover all useful updates from different distributions while ensuring robustness.

The illustrative embodiments provide mechanisms for performing intelligent aggregation of updates from local participant computing environments based on characteristics of the local datasets used in the local participant computing environments to train the local computer models and generate the updates. The illustrative embodiments utilize a dataset sketch commitment data structure, which may be provided as a vector data structure comprising multiple data statistics characterizing the local dataset implemented by the participant in training the local computer model. The dataset sketch commitment data structure is generated by locally implemented dataset sketch commitment data structure generators at the participant computing environments based on the local dataset. The dataset sketch commitment data structure generator analyzes the local dataset within the protected computing environment of the participant and generates the vector data structure describing such data statistics as the distribution of L2 norms, mean, variance, median, Principal Component Analysis (PCA) vectors, and the like.

For example, assume that the dataset is a plurality of image data files where each image is basically a grid/matrix of pixel values. The images may be organized into one or more classifications of images, e.g., images of stop signs, images of cats, images of flowers, etc. The "mean" of images of the same class refers to the average of pixel values at each pixel location over multiple, same-sized, images, with the same class label. Similarly, the median and variance of every pixel value may likewise be computed for the images in the same class. These various statistical characteristics of the dataset may be provided as a vector data structure comprising vector values corresponding to the statistical characteristics and provides a description of the dataset.

Other statistical measures that may be used to describe the data distribution of a dataset and may be part of a dataset sketch commitment data structure may be a histogram, min, max, etc., where the particular statistical measures or characteristics that are used may depend on the types of the datasets. If the dataset has mostly numerical features, the min, max, mean, standard deviation of each feature can be used as part of the dataset sketch commitment data structure. However, in other datasets, different statistical measures/characteristics may be utilized. For example, suppose a dataset is provided for training a local machine learning computer model that is a language computer model for input typing prediction for social applications in a mobile phone. Different users may have different interests, and will likely type things about different topics. The local training dataset would be the text data the users type daily on the social application. The statistical measures/characteristics for such datasets may be the keyword frequency distribution histogram, and the average sentence length, for example. Any suitable statistical measures/characteristics for the particular implementation of a dataset for training a machine learning computer model may be used to provide the dataset sketch commitment data structure without departing from the spirit and scope of the present invention.

Based on the dataset sketch commitment data structures, participants are grouped into groups having similar data statistics specified in these dataset sketch commitment data structures. The concept is that federated learning enables large scale machine learning deployment, e.g., users of mobile smartphones, portable computing devices, and the like, which involves a large number of participants. In such a large population of participants, subsets of individual participants will have similar local datasets. For example, subsets of individual users of computing devices will have similar interests, similar users use similar language, will take similar photos (dogs, flowers, etc. which are correspondingly labeled), and thus, will likely have similar local datasets that may be used to train computer models. The whole population of participants may be divided into different groups, where participants within a group have similar data distributions and draw data samples from similar data distributions. By grouping participants based on the participants having similar local datasets, the iid assumption may be satisfied in a federated learning environment, which until the advent of the present invention was not previously satisfied by federated learning mechanisms. As a result, techniques, such as robust aggregation techniques, may be more effective against malicious participants in federated learning environments, when previously such techniques were not effective as noted above.

As stated previously, in some illustrative embodiments, the grouping is based on data statistical measures/characteristics for the local datasets as indicated in the dataset sketch commitment data structures. For example, a clustering, e.g., K-means clustering, of dataset sketch commitment data structures (which again are vector data structures), may be performed on the vectors to identify groupings of participants. The result is that participants having similar local datasets are identified through the clustering or grouping performed based on the statistical characteristics of their individual local datasets used to train their own individual local computer models that are the basis for the updates provided as part of the federated machine learning.

Having identified groupings of participants, within each group, aggregation over the updates from those participants in that group (or cluster) is performed. The updates from the participants within the group are more alike other participants within the group than with participants that are not within the group, i.e., part of another group. The aggregation, e.g., robust aggregation such as trimmed-mean aggregation, median-based aggregation, or the like or scoring-based aggregation, is performed within each group from approximately identical independent distribution (iid) datasets.

Moreover, due to the clustering or grouping of similar datasets, outliner detection/filtering can be more easily performed to identify possible malicious participants. For example, based on a K-means clustering, outliers may be detected as the data that is not assigned to any particular cluster. Any suitable clustering and/or outliner detection that is currently known or later developed may be used without departing from the spirit and scope of the present invention. Malicious participants will generally have data statistics specified in their dataset sketch commitment data structures that are unlike the data statistics of other benign participants. Thus, when performing the clustering, these malicious participants will appear as outliers in the results of the clustering. Updates associated with such outliers may be discarded and not included in the federated update generation.

For example, again using an image classification machine learning computer model example and image-based datasets, the participants generate and provide dataset sketch commitment data structures that comprise the average and variance statistical measures of images of different class labels. A malicious participant may want to degrade the classification accuracy for a particular class label by sending random noise as model updates. By the clustering of dataset sketch commitment data structures (image sketches), the malicious participant is grouped with multiple benign participants having similar images. The benign participants likely have similar model updates since they have similar images, but the fake update from the malicious participant will look significantly different than the majority of updates from benign participants in order to effectively disrupt model quality.

Thus, the updates within each group are aggregated to generate group update aggregations. These group update aggregations are then themselves aggregated by the aggregator that generates the federated update for updating the federated model. The updates from outliers, which may represent possible malicious participants, may be discarded and not included in the group update aggregations that are aggregated to generate the federated update. Thus, malicious participants may be filtered out of the aggregation of the updates thereby minimizing the possibility of disrupting the federated learning process and in the process improve the quality of the federated model by updating the federated model primarily on the updates from benign participants.

It should be appreciated that in some instances, it is possible that malicious participants may collude with one another to provide dataset sketch commitment data structures having data statistics that are similar to one another and effectively avoid classification as outliers by providing a grouping of malicious participants of skew the groupings such that the malicious participants are included in groupings of benign participants. In such a situation, for a particular group, the robustness of median, mean, outlier detection, scoring performed by the clustering or grouping algorithms depend on the number of malicious participants in the particular group. The mechanisms of the illustrative embodiments are effective if, in each group, the majority of participants are benign. However, without additional protections, it is possible that multiple malicious participants may collude to fall into the same group by submitting the same or substantially similar dataset sketch commitment data structures.

In order to provide additional resiliency against colluding malicious participants, in some illustrative embodiments, the grouping or clustering algorithms may require a minimize size for each group, e.g., M participants. Groups having a size less than M participants may be discarded. The size M may be set to a desired value for the particular implementation such that a reasonable expectation of a possible number of malicious participants that may collude is no more than M/2, i.e., the majority of participants in a group will be benign even if there are malicious participants in the group. The M/2 condition is a condition under which the mechanisms of the illustrative embodiments can still guarantee effectiveness against attacks. If the number of malicious participants in a group is more than M/2, the group is compromised, and the outlier cannot be filtered out. M is a tunable value that may be set by a system administrator or the like in order to achieve a desired tolerance level for malicious participants.

In some illustrative embodiments, assuming that the mechanisms of the illustrative embodiments have a prior knowledge of the overall data distribution and corresponding testing dataset, the mechanisms of the illustrative embodiments may filter out the potential malicious participants that submit dataset sketch commitment data structures having vectors that represent unlikely data distributions. That is, after grouping participants in the manner described previously, data samples may be selected from prior public datasets which match the dataset sketch commitment data structure for the group. These samples may be used to produce a reference update against which individual participant updates may be compared to determine deviations from the reference update.

In other words, in the case that the mechanisms of the illustrative embodiments are informed as to what the federated machine learning computer model is being configured to learn, it is possible for the mechanisms of the illustrative embodiments to collect public available data before the federated learning is performed. For example, the federated learning may be configured to learn how to auto label photos from mobile users. The photos could have different labels such as flowers, dogs, cats, landscape, etc. The mechanisms of the illustrative embodiments may collect a set of images from public channels, such as image websites, social media websites (e.g., Instagram, Facebook, Twitter, or the like), news sources, and the like, with these labels being used as an initial start to learn/compute overall data distribution for a dataset, as a prior step to the federated learning of the illustrative embodiments. These reference dataset statistical characteristics may be used to correlate reference updates with groupings of participant updates.

A threshold level of deviation may be established such that if the amount of deviation from the reference update exists in a participants' update, then the participant may be flagged as a potential malicious participant and their update may be eliminated from the group level aggregation for that group. In these embodiments, the reference updates are generated from prior datasets collected from public channels. Take image auto labeling learning as example, after grouping, a group of participants sharing similar images, the dataset sketch commitment data structures may represent a specific type of images, e.g., mountain landscape. The mechanisms of these illustrative embodiments find a set of images sharing the similar dataset sketch commitment data structures to this group, and use them to train the federated machine learning computer model to get a reference update. The deviation between the reference update and received update from a participant can be measured by l2 norm distance or the like and if this deviation is equal to or greater than an established threshold, the update can be determined to be potentially malicious and eliminated from further use.

Thus, the illustrative embodiments provide an improved computing tool that provides improved functionality for performing federated machine learning of computer models in a distributed data processing environment. The improvements provide mechanisms that are effective in identifying and filtering out malicious participant contributions to the federated machine learning process. As a result, the improvements provided by the improved computing tool and improved computing tool functionality aid in minimizing or even avoiding entirely the disruption to federated machine learning that occurs from malicious participants. Moreover, the improvements provide improved computer tool mechanisms that minimize the affect of malicious participant contributions on the federated machine learning model quality. In addition, the improvements provide improved computer tool mechanisms that reduce the potential for wastefulness in computation effort of benign participants due to malicious participant contributions eroding or overshadowing the contributions of the benign participants.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory, and executed by the processor to specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As discussed previously, the present invention is specifically directed to an improved computer tool that is specifically concerned with addressing the issues of federated machine learning of computer models in a distributed data processing environment. More specifically, the present invention is specifically directed to solving the issues with regard to malicious participants in the federated machine learning process and providing improved computer tools for minimizing and/or eliminating the influences that malicious participants may have on the federated machine learning performed with regard to a federated machine learning computer model, while still maintaining privacy of the local datasets. The improved computing tool of the present invention provides an improved mechanism for identifying and eliminating contributions to the federated machine learning process that are suspected of being from malicious participants, where the improved computing tool uses specific computer clustering/grouping mechanisms and filtering mechanisms during aggregation of updates from federated machine learning participants.

Figure 2:
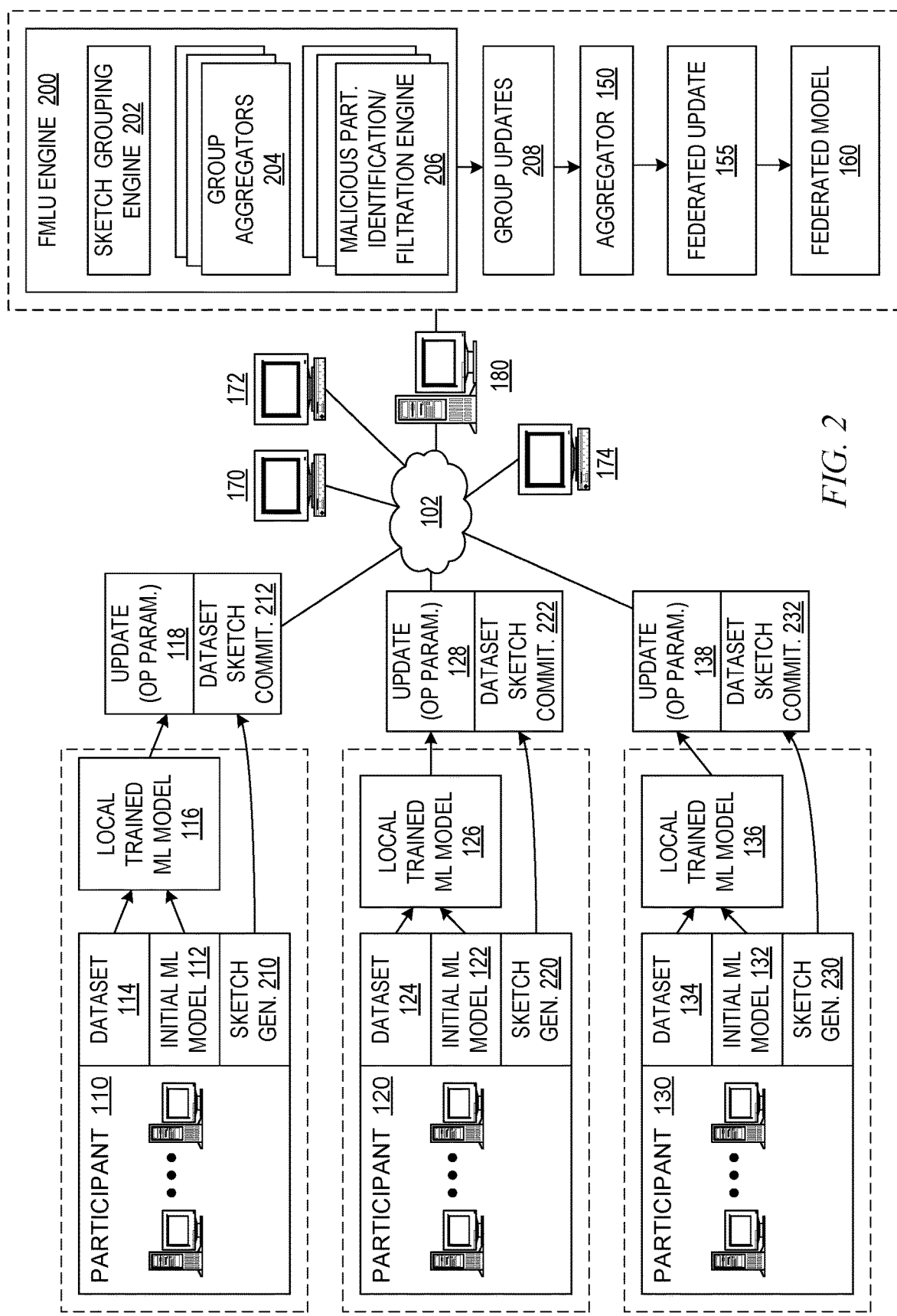
FIG. 2 is an example diagram illustrating an overall operation of a federated machine learning update engine in accordance with one illustrative embodiment.

FIG. 2 is an example diagram illustrating an overall operation of a federated machine learning update engine in accordance with one illustrative embodiment. Elements of the federated machine learning update engine that are substantially similar to elements in FIG. 1 are depicted using the same reference numerals and are intended to operate in a manner similar to that already described above with regard to FIG. 1. Differences in their configuration and operation will be described hereafter with regard to the additional elements shown in FIG. 2 and specified with reference numerals of the type "2XX". Unless otherwise indicated, the additional elements are implemented as software that executes on computing hardware and configures the computing hardware to perform the specific computer operations described herein, hardware specialized for the specific computer operations described herein, or any combination of software and hardware mechanisms, as well as corresponding data structures, stored in one or more computer storage devices, needed to realize the specific computer operations.

As shown in FIG. 2, each participant 110-130 computing environment is configured to implement a dataset sketch generator, or "sketch gen" 210-230. The dataset sketch generators 210-230 comprise computer executed logic that perform specific computer operations and computations to generate a dataset sketch commitment data structure 212, 222, and 232, for each of the corresponding local datasets 114, 124, and 134. The computer executed logic comprises logic for performing statistical analysis of the corresponding datasets 114, 124, and 134, so as to generate statistical characteristics of the datasets 114, 124, and 134 for populating vector slot values of the dataset sketch commitment data structures 212, 222, and 232. As mentioned previously, the dataset sketch commitment data structures 212, 222, and 232 may be provided as a vector data structure comprising multiple data statistics characterizing the local datasets 114, 124, and 134 implemented by the corresponding participants 110, 120, and 130 in training the local computer model 112, 122, and 132 to generate the local trained machine learning model 116, 126, and 136.

The sketch generators 210, 220, and 230 are locally implemented at the participant computing environments based on the local dataset 114, 124, and 134. The sketch generators 210, 220, and 230 analyze the local datasets 114, 124, and 134 within the protected computing environment of the participant 110, 120, and 130, and generates the vector data structure describing such data statistics or statistical characteristics, which may include such statistical characteristics as the distribution of L2 norms, mean, variance, median, Principal Component Analysis (PCA) vectors, and the like. The sketch generators 210, 220, and 230 may be distributed to the participants 110, 120, and 130 when the participants 110, 120, and 130 register to be part of the federated machine learning environment. That is, the sketch generator 210, 220, and 230 may be downloaded to the participants 110, 120, and 130 computing environments as part of the registration process with a federated machine learning administration engine (not shown), which may execute on one or more server computing devices, e.g., server 180.

Because the sketch generators 210, 220, and 230 operate within the participants 110, 120, and 130 local computing environments and output only the dataset sketch commitment data structures 212, 222, and 232 outside of the participant 110, 120, and 130 local computing environments, the datasets 114, 124, and 134 themselves are not exposed outside these local computing environments. To the contrary, the participants 110, 120, and 130 only share, outside the local computing environments, the updates 118, 128, and 138 which provide the operational parameters for updating the operational parameters of the federated model 160, and the dataset sketch commitment data structures 212, 222, and 232 which provides the statistical characteristics of the datasets 114, 124, and 134, but not the details of private data in the datasets 114, 124, and 134. Thus, the datasets 114, 124, and 134 are maintained private even though statistical characteristics about the datasets 114, 124, and 134 are provided for use in performing federated machine learning update processing and malicious participant identification and filtration.

The updates 118, 128, and 138, are provided along with the dataset sketch commitment data structures 212, 222, and 232 to the federated machine learning update (FMLU) engine 200 for specialized computer processing in accordance with one or more of the illustrative embodiments. As shown in FIG. 2, the FMLU engine 200 comprises a sketch grouping engine 202, group aggregators 204, and malicious participant identification and filtration engine 206. The FMLU engine 200 generates group updates 208 which are then provided as input to the aggregator 150, similar to the individual updates 118, 128, and 138 would be aggregated in the embodiment shown in FIG. 1. The aggregator 150 again generates a federated update 155, based on an aggregation of the group updates 208, which is then applied to the federated model 160 to thereby update the operational parameters of the federated model 160. It should be appreciated that while FIG. 2 shows the FMLU engine 200 being provided on the same server computing device 180 as the aggregator 150 and the federated computer model 160, this is not a requirement and is only depicted in this manner for ease of explanation of the inventive concepts of the present invention. To the contrary, the FMLU engine 200 may be provided on one or more other computing systems/devices different from one or more computing systems/devices that provide the aggregator 150 and/or federated computer model 160, without departing from the spirit and scope of the present invention.

As discussed previously, a significant difference in the operation depicted in FIG. 1 and the operation depicted in FIG. 2 is that the FMLU engine 200 is provided to group participants 110, 120, and 130 according to similarities in dataset sketch commitment data structures 212, 222, and 232. Thus, participants 110, 120, and 130 that use similar datasets 114, 124, and 134 with regard to statistical characteristics will be grouped into the same grouping resulting in one or more groups of participants and potentially some participants that are not sufficiently similar to other participants and thus, are outliers. The sketch grouping engine 202 of the FMLU engine 200 performs the specific computer operations for grouping or clustering the participants 110, 120, and 130, and thus their corresponding updates 118, 128, and 138, into groups.

That is, the concept is that federated learning enables large scale machine learning deployment, e.g., users of mobile smartphones, portable computing devices, and the like, which involves a large number of participants, each using corresponding local datasets 114, 124, and 134 to perform machine learning, the results of which can be used to configure a federated model 160. In this way, the federated model 160 obtains the benefit of essentially a much larger training/testing dataset comprising all of the datasets 114, 124, and 134, without having to compile and perform the training on the large training/testing dataset. Resources are distributed across multiple participants. In such a large population of participants, subsets of individual participants will have similar local datasets, and the mechanisms of the illustrative embodiments are able to analyze these local datasets and identify local datasets that are similar to one another without exposing the local datasets outside of their local computing environments. The sketch grouping engine 202 of the FMLU engine 200 is able to divide the whole population of participants into different groups, where participants within a group have similar data distributions and draw data samples from similar data distributions as indicated by the statistical characteristics in their corresponding dataset sketch commitment data structures 212, 222, and 232. By grouping participants based on the participants having similar local datasets 114, 124, and 134, the iid assumption may be satisfied in a federated learning environment, as discussed previously. As a result, techniques, such as robust aggregation techniques, may be more effective against malicious participants in federated learning environments, when previously such techniques were not effective.

The grouping, or clustering, performed by the sketch grouping engine 202 may include any known or later developed grouping/clustering technique and algorithms. For example, K-means clustering of dataset sketch commitment data structures 212, 222, and 232 (which again are vector data structures), may be performed on the vectors to identify groupings of participants 110, 120, and 130, and their corresponding updates 118, 128, and 138. The result is that participants having similar local datasets 114, 124, and 134 are identified through the clustering or grouping performed based on the statistical characteristics of their individual local datasets 114, 124, and 134 used to train their own individual local computer models 112, 122, 132 (to generate local trained ML models 116, 126, and 136) that are the basis for the updates 118, 128, and 138 provided as part of the federated machine learning. The similarity of statistical characteristics may be determined using any desired clustering/grouping algorithm and may apply any suitable similarity criteria. For example, assume a language machine learning computer model embodiment, such as previously mentioned above. In such an example, with some simplification, assume that PARTICIPANT 1 (P1) is a flower person and has a word frequency distribution of ["flower":90%, "dog": 5% other word:5%], PARTICIPANT 2 (P2) has a word frequency distribution of [ "flower":80%, "dog":10%, others "10%"], participants P3 and P4 are dog persons having word frequency distributions of ["flower":5%, "dog", 95%, others 0%] and ["flower": 10%, "dog":85%, others 5%]. In this example, the difference between these distributions can be measured by l2 norm. P1 [90%, 5%, 5%] and P2 [80%, 10%, 10%] are closer pairs. P3 [5%, 95%, 0%] and P4 [10%, 85%, 5%] are closer to each other. The clustering process essentially groups P1 and P2 into one group, and P3 and P4 into another group.

Based on the results of the sketch grouping engine 202, groupings or clusters of participants are identified. Within each group/cluster, a corresponding group aggregator 204 aggregates the updates from those participants in that group (or cluster). The updates from the participants within the group are more alike other participants within the group than with participants that are not within the group, i.e., part of another group. The aggregation, e.g., robust aggregation such as trimmed-mean aggregation, median-based aggregation, or the like, or scoring-based aggregation, is performed within each group from approximately identical independent distribution (iid) datasets. This results in a separate aggregated update for each group/cluster and thus, if there are a plurality of groups/clusters, then there is a corresponding number of aggregated updates, each aggregated update being an aggregation of the updates from the participants of that particular group. Thus, for example, if participants 110 and 120 are grouped together into a first group and participant 130 is grouped together with another participant (not shown) into a second group, the updates 118 and 128 are aggregated by a group aggregator 204 to generate a first group aggregated update, while the update 138 and updates from the other participants in the group with participant 130, may be aggregated together to generate a second group aggregated update (also referred to herein as a "group update").

Due to the clustering or grouping of similar datasets based on the dataset sketch commitment data structures 212, 222, and 232, outliner detection/filtering can be more easily performed by the malicious participant identification and filtration engine 206 to identify possible malicious participants. Any suitable clustering and/or outliner detection that is currently known or later developed may be used without departing from the spirit and scope of the present invention. Malicious participants will generally have data statistical characteristics specified in their dataset sketch commitment data structures 118, 128, and 138 that are unlike the data statistics of other benign participants, e.g., if participant 130 is a malicious participant, the dataset sketch commitment 232 will have statistical characteristic vector values that differ significantly enough from the other dataset sketch commitment data structures 212 and 222 that participant 130 will not be grouped/clustered with the other participants 110 and 120 and hence, will be an outlier.

The updates, e.g., update 138, associated with such outliers may be discarded or filtered out by the malicious participant identification/filtration engine 206 and not included in the federated update generation. The malicious participant identification/filtration engine 206 applies malicious participant identification/filtration criteria to identify malicious participants to filter out their updates in contributing to the federated update 155 applied to the federated model 160. For the updates that are equal to or more than a predetermined distance away from a nearest cluster/group may be determined to be outliers, i.e., malicious participants and their corresponding updates discarded or filtered out. The updates that are not equal to or more than a predetermined distance away may have their updates maintained as part of the group updates 208 used to generate the federated update 155. This may allow for participants that are not malicious, but are using datasets that have differences from other participants. The "distance" may be measured in terms of differences in statistical characteristics of datasets, as indicated in the dataset sketch commitment data structures, relative to a representative participant for each group/cluster, e.g., a center of each group/cluster. One example distance metric is the l2 norm distance between update vectors. For a group of updates, the average of vectors may be computed as the center and the distances from every update to the center may also be computed. To decide if an update vector is an outlier, its distance to the center may be computed and compared to a threshold distance. The threshold can be set according to the distribution of all these distances to the center. An example value for the threshold distance value may be the average distance to the center of every update+2×standard deviation of these distances. This is just one example and is not intended to be limiting of the illustrative embodiments or the present invention. Other distance metrics and threshold value calculations may be used without departing from the spirit and scope of the present invention.

Thus, the updates within each group are aggregated to generate group update aggregations, or simply group updates, and updates from potentially malicious participants are identified and filtered out by the malicious participant identification/filtration engine 206. The remaining group updates are part of the group updates 208 and are provided to the aggregator 150 which generates the federated update 155 for updating the federated model 160. The updates from outliers, which may represent possible malicious participants, are not part of the group updates 208 and thus, are not part of the aggregation performed by the aggregator 150. Thus, malicious participants may be filtered out of the aggregation of the updates thereby minimizing the possibility of disrupting the federated learning process and in the process improve the quality of the federated model 160 by updating the federated model 160 primarily on the updates from benign participants.

As noted previously, in some instances, it is possible that malicious participants may collude with one another to provide dataset sketch commitment data structures having data statistical characteristics that are similar to one another and effectively avoid classification as outliers by providing a grouping of malicious participants or skew the groupings such that the malicious participants are included in groupings of benign participants. In such a situation, for a particular group, the robustness of median, mean, outlier detection, scoring performed by the clustering or grouping algorithms depend on the number of malicious participants in the particular group. The mechanisms of the illustrative embodiments are effective if, in each group, the majority of participants are benign. However, without additional protections, it is possible that multiple malicious participants may collude to fall into the same group by submitting the same or substantially similar dataset sketch commitment data structures.

In order to provide additional resiliency against colluding malicious participants, in some illustrative embodiments, the grouping or clustering performed by the sketch grouping engine 202 can require a minimize size for each group, e.g., M participants. Groups having a size less than M participants may be discarded, similar to the discarding of potential malicious participants previously described above. The size M may be set to a desired value for the particular implementation such that a reasonable expectation of a possible number of malicious participants that may collude is no more than M/2, i.e., the majority of participants in a group will be benign even if there are malicious participants in the group.

In some illustrative embodiments, assuming that the FMLU engine 200 is provided with a prior knowledge of the overall data distribution and corresponding testing dataset, as previously discussed above, the mechanisms of the illustrative embodiments may filter out the potential malicious participants at the sketch grouping engine 202 level of processing, where these malicious participants are ones that submit dataset sketch commitment data structures 212, 222, 232 having vectors that represent unlikely data distributions. That is, after the sketch grouping engine 202 groups participants in the manner described previously, the sketch grouping engine 2020 may collect data samples from public channels that share similar characteristics, i.e., dataset sketch commitment data structures, as the local datasets. After the clustering of dataset sketch commitment data structures, the dataset sketch commitment data structures in the same group should be close to each other. The center or average of the dataset sketch data structures for a group may be used as a representative group dataset sketch commitment data structure for that group, for example, and data samples from public channels that have similar dataset sketch commitment data structures to this representative group dataset sketch commitment data structure may be obtained.

These samples collected from public channels may be used to produce a reference update against which individual participant updates 118, 128, and 138 may be compared to determine deviations from the reference update. A threshold level of deviation may be established such that if the amount of deviation from the reference update exists in a participants' update 118, 128, and 138, then the participant may be flagged as a potential malicious participant within the group and their update 118, 128, or 138 may be eliminated from the group level aggregation for that group performed by the group aggregators 204.

Thus, the illustrative embodiments provide an improved computing tool that provides improved functionality for performing federated machine learning of computer models in a distributed data processing environment. The improvements provide mechanisms that are effective in identifying and filtering out malicious participant contributions to the federated machine learning process. As a result, the improvements provided by the improved computing tool and improved computing tool functionality aid in minimizing or even avoiding entirely the disruption to federated machine learning that occurs from malicious participants. Moreover, the improvements provide improved computer tool mechanisms that minimize the effect of malicious participant contributions on the federated machine learning model quality. In addition, the improvements provide improved computer tool mechanisms that reduce the potential for wastefulness in computation effort of benign participants due to malicious participant contributions eroding or overshadowing the contributions of the benign participants.

Figure 3:
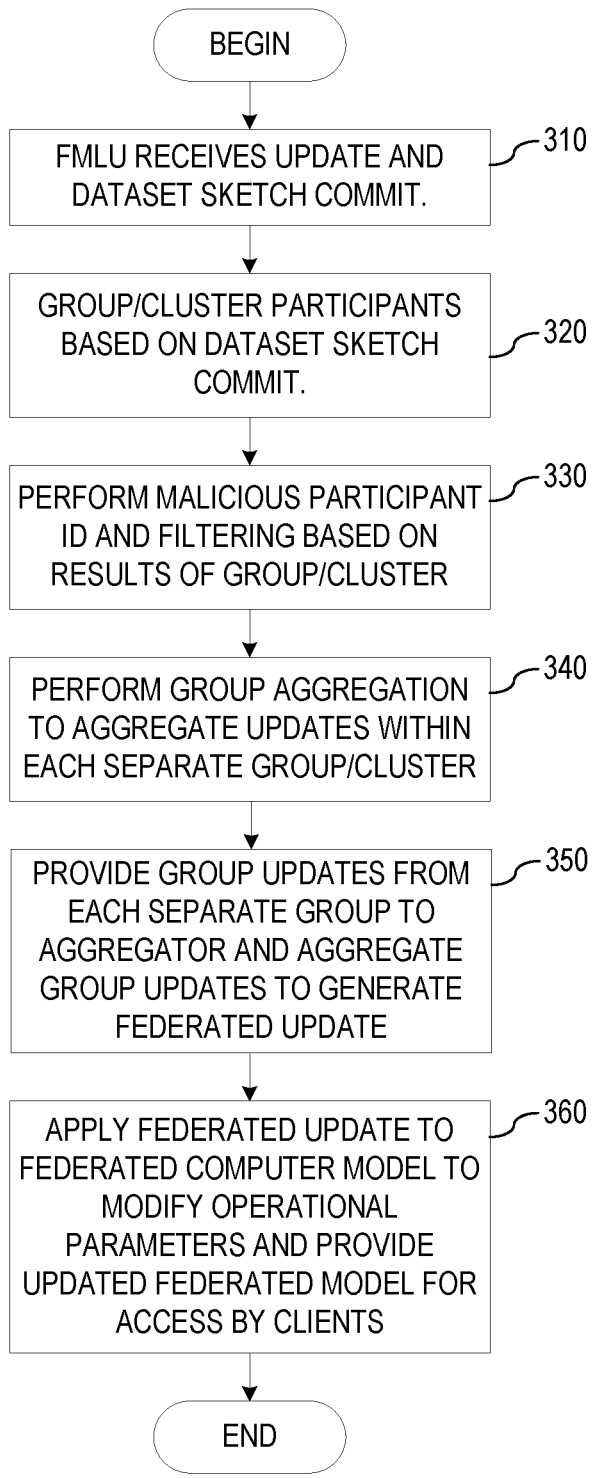
FIG. 3 is a flowchart outlining an example operation for performing federated machine learning with dataset sketch based malicious participant detection and filtration in accordance with one illustrative embodiment.

FIG. 3 is a flowchart outlining an example operation for performing federated machine learning with dataset sketch based malicious participant detection and filtration in accordance with one illustrative embodiment. The operation outlined in FIG. 3 may be performed by a federated machine learning update (FMLU) engine in accordance with one illustrative embodiment. The FMLU engine operates on input received from participant computing environments of registered participants in the federated learning environment. As part of this interaction with the participant computing environments, the FMLU engine may receive dataset sketch commitment data structures from sketch generators deployed into the participant computing environments. Thus, the FMLU engine may receive, as input, both the updates to operational parameters from the participant computing environments based on the local training of a local trained ML model, as well as a generated dataset sketch commitment data structure from the participant computing environments, which describes the statistical characteristics of the local datasets used to perform the local training (step 310).

Based on the received dataset sketch commitment data structures, a sketch grouping engine of the FMLU engine groups/clusters participants into groups/clusters where participants within a group/cluster utilize datasets having similar statistical characteristics (step 320). Malicious participant identification and filtration is performed based on results of the grouping so as to identify outliers that are potential malicious participants as well as identify participants within groups that have sufficiently disparate sketch data structures from other participants within the group that they may be potential malicious participants within a group (step 330). Group aggregators aggregate the updates for the various individual groups to generate for each group a group update, after having identified and filtered out potential malicious participants (step 340). The group updates are provided to an aggregator which aggregates the group updates to determine a federated update (step 350). The federated update is then applied to a federated computer model to modify the operational parameters of the federated computer model based on the federated machine learning by the various benign participants (step 360). The updated federated machine learning computer model may be provided for access by users, such as client computing devices, to process their data and generate results, e.g., process image data to classify the images into particular classifications, process medical image data to identify anomalies, process patient data to generate treatment recommendations, or any other use to which artificial intelligence systems, such as may employ the updated federated machine learning model, may be applied. The operation then terminates.

Thus, the illustrative embodiments provide an improved computer tool and improved computer tool operations specifically designed to operate in a federated machine learning environment in which multiple participant computing environments, each of which may include one or more computing systems/devices, collaborate by performing local machine learning training of local machine learning computer models and provide the operational parameter results as updates to be aggregated or combined and applied to a federated machine learning computer model for use by other users/client computing devices. The improved computer tool and improved computer tool operations are specifically directed to being able to identify and filter out potentially malicious participants that may be part of the federated machine learning environment. Moreover, the improved computer tool and improved computer tool operations perform such identification and filtration of potentially malicious participants without exposing the local datasets used by the participants outside their local participant computing environments, thereby preserving the privacy of the local datasets.

Figure 4:
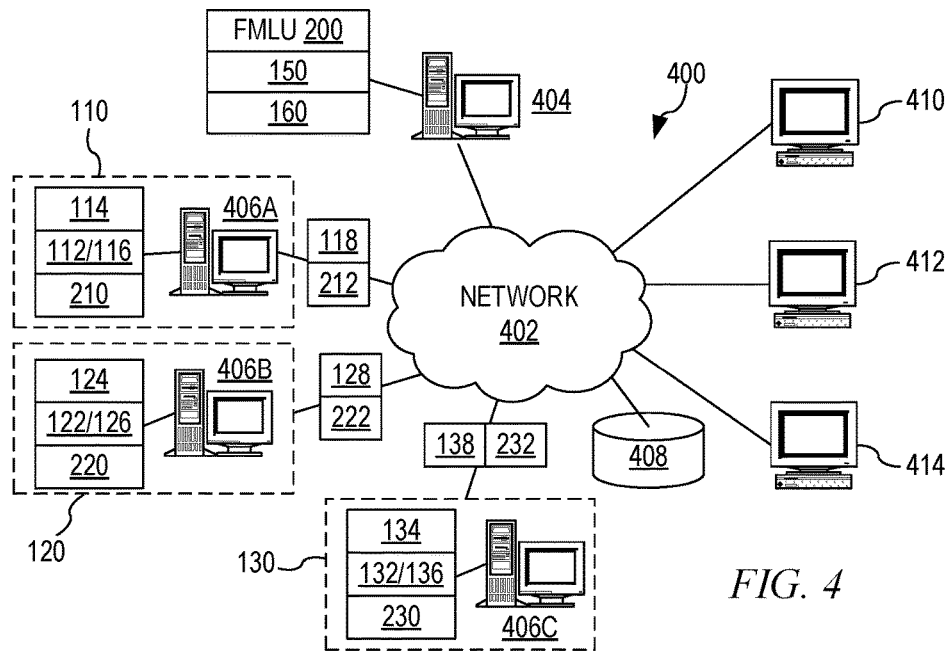
FIG. 4 is an example diagram of a distributed data processing system in which aspects of the illustrative embodiments may be implemented.
Figure 5:
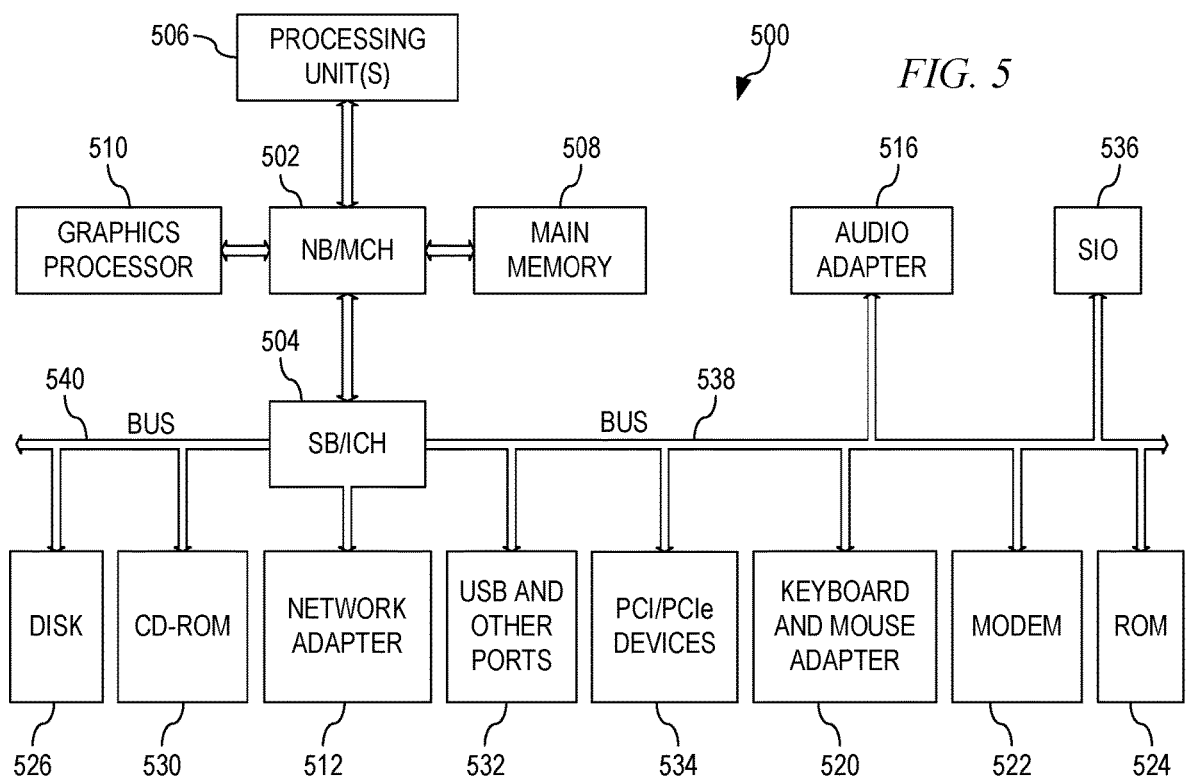
FIG. 5 is an example block diagram of a computing device in which aspects of the illustrative embodiments may be implemented.

Based on the above description, it is clear that the illustrative embodiments may be utilized in many different types of distributed data processing environments. In order to provide a context for the description of the specific elements and functionality of the illustrative embodiments, FIGS. 4 and 5 are provided hereafter as an example distributed data processing environment and computing device in which aspects of the illustrative embodiments may be implemented. It should be appreciated that FIGS. 4 and 5 are only examples and are not intended to assert or imply any limitation with regard to the environments in which aspects or embodiments of the present invention may be implemented. Many modifications to the depicted environments may be made without departing from the spirit and scope of the present invention.

FIG. 4 depicts a pictorial representation of an example distributed data processing system in which aspects of the illustrative embodiments may be implemented. Distributed data processing system 400 may include a network of computers in which aspects of the illustrative embodiments may be implemented. The distributed data processing system 400 contains at least one network 402, which is the medium used to provide communication links between various devices and computers connected together within distributed data processing system 400. The network 402 may include connections, such as wire, wireless communication links, or fiber optic cables.

In the depicted example, server 404 and servers 406A-C are connected to network 402 along with storage unit 408. The servers 406A-C are shown as being part of participant computing environments, such as participant computing environments 110, 120, and 130 in FIGS. 1 and 2. It should be appreciated that while computing devices 406A-C are depicted as server computing devices, they can in fact be other types of computing devices and there may be more than one computing device in each participant computing environment 110, 120, and 130 that is part of the federated learning environment of the illustrative embodiments. For example, one or more of the servers 406A-C may be portable computing devices, mobile communication devices, or the like, and are not limited to being servers.

In addition, clients 410, 412, and 414 are also connected to network 402. These clients 410, 412, and 414 may be, for example, personal computers, network computers, or the like. Although not shown in FIG. 4, one or more of the clients 410, 412, and 414 may also be part of participant computing environments that are part of the federated machine learning environment. In short, any computing device may be a participant in the federated machine learning environment as long as it is configured and capable of performing a local machine learning operation on a local machine learning computer model and can provide updates to a federated machine learning computer model. In addition, in accordance with one or more of the illustrative embodiments, the computing devices that are part of the federated machine learning environment, will also need to be configured and capable of executing a dataset sketch generator that provides a dataset sketch commitment data structure to the FMLU engine 200 operating on server 404.

In the depicted example, one or more servers, such as server 404, for example, may also provide data, such as boot files, operating system images, and applications to the clients 410, 412, and 414. As mentioned above, specific to the illustrative embodiments, the server 404 may also provide a federated machine learning computer model 160 for use by clients 410, 412, and 414 to process their data and provide results back via the network 402. Clients 410, 412, and 414 are clients to server 404 in the depicted example. Distributed data processing system 400 may include additional servers, clients, and other devices not shown.

In the depicted example, distributed data processing system 400 is the Internet with network 402 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 400 may also be implemented to include a number of different types of networks, such as for example, an intranet, a local area network (LAN), a wide area network (WAN), or the like. As stated above, FIG. 4 is intended as an example, not as an architectural limitation for different embodiments of the present invention, and therefore, the particular elements shown in FIG. 4 should not be considered limiting with regard to the environments in which the illustrative embodiments of the present invention may be implemented.

As shown in FIG. 4, one or more of the computing devices, e.g., server 404, may be specifically configured to implement a federated machine learning update (FMLU) engine 200, aggregator 150, and federated model 160, while one or more other computing devices, e.g., other servers 406A-C and/or client computing devices 410-414, associated with federated machine learning participant computing environments 110, 120, and 130, may be configured with sketch generators 210, 220, 230 for generating dataset sketch commitment data structures. The participant computing environments 110, 120, and 130 further comprise local datasets and local machine learning computer models, e.g., elements 112-116, 122-126, and 132-136, respectively. The participant computing environments submit updates 118, 128, and 138 as well as dataset sketch commitment data structures 212, 222, and 232, to the FMLU engine 200, as previously described above. The FMLU engine 200 performs grouping based on the dataset sketch commitment data structures, as well as malicious participant identification and filtration, to thereby generate group updates for the various groupings of participants which are then provided to the aggregator 150 for aggregation and generation of a federated update of operational parameters to apply to the federated computer model 160.

The configuring of the computing devices with mechanisms of the illustrative embodiments may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 404, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described herein, the implementation of the mechanisms of the illustrative embodiments improves the functionality of the computing device and provides a useful and concrete result that facilitates the detection and filtration of updates submitted by potentially malicious participants in a federated machine learning environment.

As noted above, the mechanisms of the illustrative embodiments utilize specifically configured computing devices, or data processing systems, to perform the operations for detection and filtration of updates submitted by potentially malicious participants in the federated machine learning environment. These computing devices, or data processing systems, may comprise various hardware elements which are specifically configured, either through hardware configuration, software configuration, or a combination of hardware and software configuration, to implement one or more of the systems/subsystems described herein. FIG. 5 is a block diagram of just one example data processing system in which aspects of the illustrative embodiments may be implemented. Data processing system 500 is an example of a computer, such as server 404 in FIG. 4, in which computer usable code or instructions implementing the processes and aspects of the illustrative embodiments of the present invention may be located and/or executed so as to achieve the operation, output, and external effects of the illustrative embodiments as described herein.

In the depicted example, data processing system 500 employs a hub architecture including north bridge and memory controller hub (NB/MCH) 502 and south bridge and input/output (I/O) controller hub (SB/ICH) 504. Processing unit 506, main memory 508, and graphics processor 510 are connected to NB/MCH 502. Graphics processor 510 may be connected to NB/MCH 502 through an accelerated graphics port (AGP).

In the depicted example, local area network (LAN) adapter 512 connects to SB/ICH 504. Audio adapter 516, keyboard and mouse adapter 520, modem 522, read only memory (ROM) 524, hard disk drive (HDD) 526, CD-ROM drive 530, universal serial bus (USB) ports and other communication ports 532, and PCI/PCIe devices 534 connect to SB/ICH 504 through bus 538 and bus 540. PCI/PCIe devices may include, for example, Ethernet adapters, add-in cards, and PC cards for notebook computers. PCI uses a card bus controller, while PCIe does not. ROM 524 may be, for example, a flash basic input/output system (BIOS).

HDD 526 and CD-ROM drive 530 connect to SB/ICH 504 through bus 540. HDD 526 and CD-ROM drive 530 may use, for example, an integrated drive electronics (IDE) or serial advanced technology attachment (SATA) interface. Super I/O (SIO) device 536 may be connected to SB/ICH 504.

An operating system runs on processing unit 506. The operating system coordinates and provides control of various components within the data processing system 500 in FIG. 5. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 500.

As a server, data processing system 500 may be, for example, an IBM eServer™ System P® computer system, Power™ processor based computer system, or the like, running the Advanced Interactive Executive (AIX®) operating system or the LINUX® operating system. Data processing system 500 may be a symmetric multiprocessor (SMP) system including a plurality of processors in processing unit 506. Alternatively, a single processor system may be employed.

Instructions for the operating system, the object-oriented programming system, and applications or programs are located on storage devices, such as HDD 526, and may be loaded into main memory 508 for execution by processing unit 506. The processes for illustrative embodiments of the present invention may be performed by processing unit 506 using computer usable program code, which may be located in a memory such as, for example, main memory 508, ROM 524, or in one or more peripheral devices 526 and 530, for example.

A bus system, such as bus 538 or bus 540 as shown in FIG. 5, may be comprised of one or more buses. Of course, the bus system may be implemented using any type of communication fabric or architecture that provides for a transfer of data between different components or devices attached to the fabric or architecture. A communication unit, such as modem 522 or network adapter 512 of FIG. 5, may include one or more devices used to transmit and receive data. A memory may be, for example, main memory 508, ROM 524, or a cache such as found in NB/MCH 502 in FIG. 5.

As mentioned above, in some illustrative embodiments the mechanisms of the illustrative embodiments may be implemented as application specific hardware, firmware, or the like, application software stored in a storage device, such as HDD 526 and loaded into memory, such as main memory 508, for executed by one or more hardware processors, such as processing unit 506, or the like. As such, the computing device shown in FIG. 5 becomes specifically configured to implement the mechanisms of the illustrative embodiments and specifically configured to perform the operations and generate the outputs described herein with regard to the sketch generator and/or the FMLU engine.

Those of ordinary skill in the art will appreciate that the hardware in FIGS. 4 and 5 may vary depending on the implementation. Other internal hardware or peripheral devices, such as flash memory, equivalent non-volatile memory, or optical disk drives and the like, may be used in addition to or in place of the hardware depicted in FIGS. 4 and 5. Also, the processes of the illustrative embodiments may be applied to a multiprocessor data processing system, other than the SMP system mentioned previously, without departing from the spirit and scope of the present invention.

Moreover, the data processing system 500 may take the form of any of a number of different data processing systems including client computing devices, server computing devices, a tablet computer, laptop computer, telephone or other communication device, a personal digital assistant (PDA), or the like. In some illustrative examples, data processing system 500 may be a portable computing device that is configured with flash memory to provide non-volatile memory for storing operating system files and/or user-generated data, for example. Essentially, data processing system 500 may be any known or later developed data processing system without architectural limitation.

It should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising computer executable code that, when executed by the at least one processor, causes the at least one processor to be specifically configured to implement a federated machine learning update (FMLU) engine, the method comprising:

receiving, by the FMLU engine, from a plurality of participant computing systems, a plurality of machine learning (ML) computer model parameter updates for updating a federated ML computer model;

receiving, by the FMLU engine, from the plurality of participant computing systems, a plurality of dataset sketch commitment data structures, wherein each dataset sketch commitment data structure provides statistical characteristics of a corresponding local dataset used by a corresponding participant computing system to train a local ML computer model that is local to the participant computing system;

performing, by the FMLU engine, a potentially malicious participant identification operation based on an analysis of the plurality of dataset sketch commitment data structures to identify one or more potentially malicious participants based on differences in dataset sketch commitment data structures;

discarding, by the FMLU engine, ML computer model parameter updates received from participant computing systems identified as potentially malicious participants to thereby generate a modified set of updates; and updating parameters of the federated ML computer model based on the modified set of updates.

2. The method of claim 1, wherein the potentially malicious participant identification operation identifies outlier dataset sketch commitment data structures, and identifies corresponding participant computing systems, from which the outlier dataset sketch commitment data structures were received, as potentially malicious participants of a federated machine learning environment.

3. The method of claim 2, wherein the potentially malicious participant identification operation comprises clustering participant computing systems into one or more clusters based on similarity of statistical characteristics, specified in dataset sketch commitment data structures, to one another.

4. The method of claim 3, wherein updating parameters of the federated ML computer model comprises performing, for each cluster in the one or more clusters, a group aggregation operation that aggregates the ML computer model parameter updates received from participating computing systems that are clustered into the cluster to generate a group update aggregation data structure, and updating parameters of the federated ML computer model based on an aggregation of the group update aggregation data structures corresponding to the one or more clusters.

5. The method of claim 3, wherein the potentially malicious participant identification operation further comprises determining a size of each cluster in the one or more clusters and discarding clusters that do not have a minimum size.

6. The method of claim 3, wherein the potentially malicious participant identification operation further comprises, for each cluster in the one or more clusters:

generating a set of reference dataset statistical characteristics for a similar type of data as the local datasets, based on publicly available data;

comparing dataset sketch commitment data structure statistical characteristics, for each of the participant computing systems clustered into the cluster, to the set of reference dataset statistical characteristics to determine a difference between the corresponding dataset sketch commitment data structure statistical characteristics and the set of reference dataset statistical characteristics and determine whether or not the difference is equal to or greater than a threshold difference;

identifying participant computing systems whose corresponding difference is equal to or greater than the threshold difference as potentially malicious participants; and discarding ML computer model parameter updates received from participant computing systems identified as potentially malicious participants.

7. The method of claim 1, wherein each dataset sketch commitment data structure is generated by a corresponding dataset sketch generator deployed into a local computing environment of the participant computing system and operates to analyze a corresponding local dataset within the local computing environment of the participant computing system, and wherein the dataset sketch commitment data structures are vector data structures, output by the dataset sketch generators, having vector values corresponding to different data statistics characterizing a corresponding local dataset.

8. The method of claim 7, wherein the different data statistics comprise at least one of one or more mean values for corresponding data values of the dataset, one or more median values for corresponding data values of the dataset, one or more variance values for corresponding data values of the dataset, one or more minimum values for corresponding data values of the dataset, one or more maximum values for corresponding data values of the dataset, or a histogram of data values of the dataset.

9. The method of claim 7, wherein data of the corresponding local dataset comprises image data, and wherein the different data statistics comprise, for each pixel location, across a plurality of images in the image data, at least one of a mean value for the pixel location, a median value for the pixel location, a variance value for the pixel location, a minimum value for the pixel location, a maximum value for the pixel location, or a histogram of values for the pixel location.

10. The method of claim 1, wherein updating parameters of the federated ML computer model comprises aggregating the ML computer model parameter updates of the modified set of updates to generate an aggregated update, and modifying the parameters of the federated ML computer model based on the aggregated update.

11. A computer program product comprising a computer readable storage medium having a computer readable program stored therein, wherein the computer readable program, when executed on a computing device, specifically configures the computing device to implement a federated machine learning update (FMLU) engine, which operates to:

receive, from a plurality of participant computing systems, a plurality of machine learning (ML) computer model parameter updates for updating a federated ML computer model;

receive, from the plurality of participant computing systems, a plurality of dataset sketch commitment data structures, wherein each dataset sketch commitment data structure provides statistical characteristics of a corresponding local dataset used by a corresponding participant computing system to train a local ML computer model that is local to the participant computing system;

perform a potentially malicious participant identification operation based on an analysis of the plurality of dataset sketch commitment data structures to identify one or more potentially malicious participants based on differences in dataset sketch commitment data structures;

discard ML computer model parameter updates received from participant computing systems identified as potentially malicious participants to thereby generate a modified set of updates; and update parameters of the federated ML computer model based on the modified set of updates.

12. The computer program product of claim 11, wherein the potentially malicious participant identification operation identifies outlier dataset sketch commitment data structures, and identifies corresponding participant computing systems, from which the outlier dataset sketch commitment data structures were received, as potentially malicious participants of a federated machine learning environment.

13. The computer program product of claim 12, wherein the potentially malicious participant identification operation comprises clustering participant computing systems into one or more clusters based on similarity of statistical characteristics, specified in dataset sketch commitment data structures, to one another.

14. The computer program product of claim 13, wherein updating parameters of the federated ML computer model comprises performing, for each cluster in the one or more clusters, a group aggregation operation that aggregates the ML computer model parameter updates received from participating computing systems that are clustered into the cluster to generate a group update aggregation data structure, and updating parameters of the federated ML computer model based on an aggregation of the group update aggregation data structures corresponding to the one or more clusters.

15. The computer program product of claim 13, wherein the potentially malicious participant identification operation further comprises determining a size of each cluster in the one or more clusters and discarding clusters that do not have a minimum size.

16. The computer program product of claim 13, wherein the potentially malicious participant identification operation further comprises, for each cluster in the one or more clusters:

generating a set of reference dataset statistical characteristics for a similar type of data as the local datasets, based on publicly available data;

comparing dataset sketch commitment data structure statistical characteristics, for each of the participant computing systems clustered into the cluster, to the set of reference dataset statistical characteristics to determine a difference between the corresponding dataset sketch commitment data structure statistical characteristics and the set of reference dataset statistical characteristics and determine whether or not the difference is equal to or greater than a threshold difference;

identifying participant computing systems whose corresponding difference is equal to or greater than the threshold difference as potentially malicious participants; and discarding ML computer model parameter updates received from participant computing systems identified as potentially malicious participants.

17. The computer program product of claim 11, wherein each dataset sketch commitment data structure is generated by a corresponding dataset sketch generator deployed into a local computing environment of the participant computing system and operates to analyze a corresponding local dataset within the local computing environment of the participant computing system, and wherein the dataset sketch commitment data structures are vector data structures, output by the dataset sketch generators, having vector values corresponding to different data statistics characterizing a corresponding local dataset.

18. The computer program product of claim 17, wherein the different data statistics comprise at least one of one or more mean values for corresponding data values of the dataset, one or more median values for corresponding data values of the dataset, one or more variance values for corresponding data values of the dataset, one or more minimum values for corresponding data values of the dataset, one or more maximum values for corresponding data values of the dataset, or a histogram of data values of the dataset.

19. The computer program product of claim 17, wherein data of the corresponding local dataset comprises image data, and wherein the different data statistics comprise, for each pixel location, across a plurality of images in the image data, at least one of a mean value for the pixel location, a median value for the pixel location, a variance value for the pixel location, a minimum value for the pixel location, a maximum value for the pixel location, or a histogram of values for the pixel location.

20. An apparatus comprising:

a processor; and a memory coupled to the processor, wherein the memory comprises instructions which, when executed by the processor specifically configures the computing device to implement a federated machine learning update (FMLU) engine, which operates to:

receive, from a plurality of participant computing systems, a plurality of machine learning (ML) computer model parameter updates for updating a federated ML computer model;

receive, from the plurality of participant computing systems, a plurality of dataset sketch commitment data structures, wherein each dataset sketch commitment data structure provides statistical characteristics of a corresponding local dataset used by a corresponding participant computing system to train a local ML computer model that is local to the participant computing system;

perform a potentially malicious participant identification operation based on an analysis of the plurality of dataset sketch commitment data structures to identify one or more potentially malicious participants based on differences in dataset sketch commitment data structures;

discard ML computer model parameter updates received from participant computing systems identified as potentially malicious participants to thereby generate a modified set of updates; and update parameters of the federated ML computer model based on the modified set of updates.

* * * * *